United States Patent [19]

Kleim

[11] 4,241,665
[45] Dec. 30, 1980

[54] ARTICULATED RAILWAY CAR CONNECTING PASSAGE

[75] Inventor: Karl-Heinz Kleim, Nürnberg, Fed. Rep. of Germany

[73] Assignee: Maschinenfabrik Augsburg-Nürnberg Aktiengesellschaft, Nürnberg, Fed. Rep. of Germany

[21] Appl. No.: 852,987

[22] Filed: Nov. 21, 1977

[30] Foreign Application Priority Data

Nov. 20, 1976 [DE] Fed. Rep. of Germany ....... 2652819

[51] Int. Cl.³ .......................... B61F 3/12; B61F 5/16; F16C 19/18; F16C 33/80
[52] U.S. Cl. ................................. 105/4 R; 105/8 R; 105/18; 105/59; 105/133; 277/56; 296/1 R; 308/221; 403/288
[58] Field of Search .............. 105/4 A, 4 R, 8 R, 8 A, 105/15, 18, 59, 133; 277/56, 57; 308/220, 221, 223; 403/288; 296/1 R

[56] References Cited

U.S. PATENT DOCUMENTS

| 1,717,058 | 6/1929 | Miller ...................................... 105/59 |
| 1,865,406 | 6/1932 | Clarke et al. ......................... 105/4 R |
| 2,132,001 | 10/1938 | Dean .................................. 105/4 R X |
| 2,843,417 | 7/1958 | Wahl et al. ............................ 296/1 R |
| 3,075,614 | 1/1963 | Grundon ......................... 308/221 X |
| 3,922,971 | 12/1975 | Maroshick ........................ 105/8 R X |

FOREIGN PATENT DOCUMENTS

| 1051892 | 8/1964 | Fed. Rep. of Germany .......... 105/4 R |
| 1222965 | 8/1966 | Fed. Rep. of Germany ............. 105/59 |
| 1292162 | 4/1969 | Fed. Rep. of Germany ............. 105/59 |
| 2318369 | 10/1974 | Fed. Rep. of Germany .......... 105/4 R |

Primary Examiner—Howard Beltran
Attorney, Agent, or Firm—Becker & Becker, Inc.

[57] ABSTRACT

A system for articulated bogie-type rail vehicles in which the adjacent ends of the car bodies are pivotally and rotatably supported by supporting arms extending beyond their end trusses on a single-part connecting portal jointed by bellows to the car box ends and mounted on a transverse support. The portal is tightly enclosed by a sealing member on its full perimeter and has a spring mounted platform supported with vertical freedom of movement but with minimum play in all other directions on the bogie. This platform is pivotally arranged by at least one centrally located rotation ball race and by the supporting arms. This rotation ball race has three race rings and two rows of balls. Of these three race rings one race ring is kinematically associated with the front car body while another race ring is kinematically associated with the rear car body, and the third race ring is kinematically associated with the transverse support supporting the portal and the platform.

12 Claims, 6 Drawing Figures

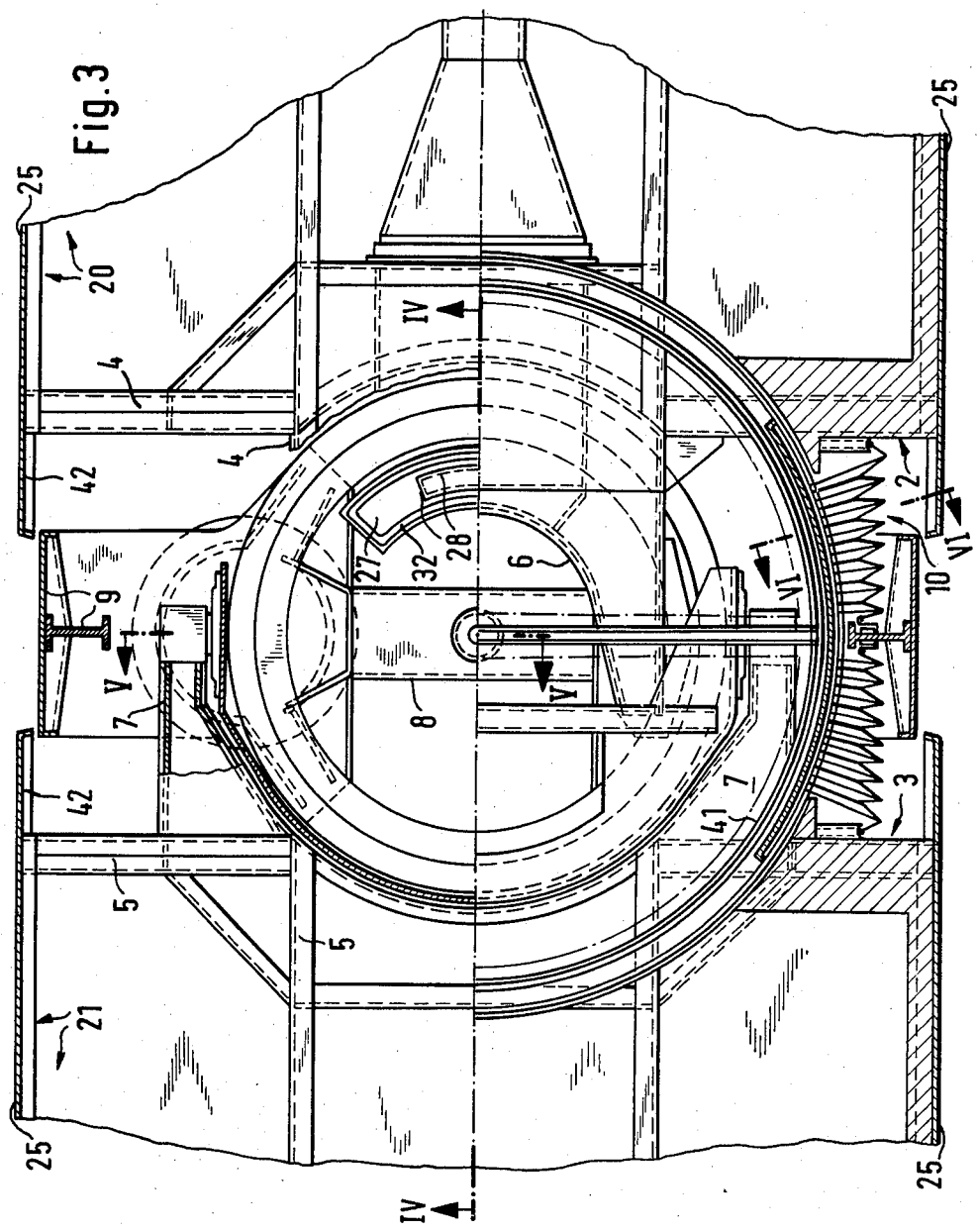

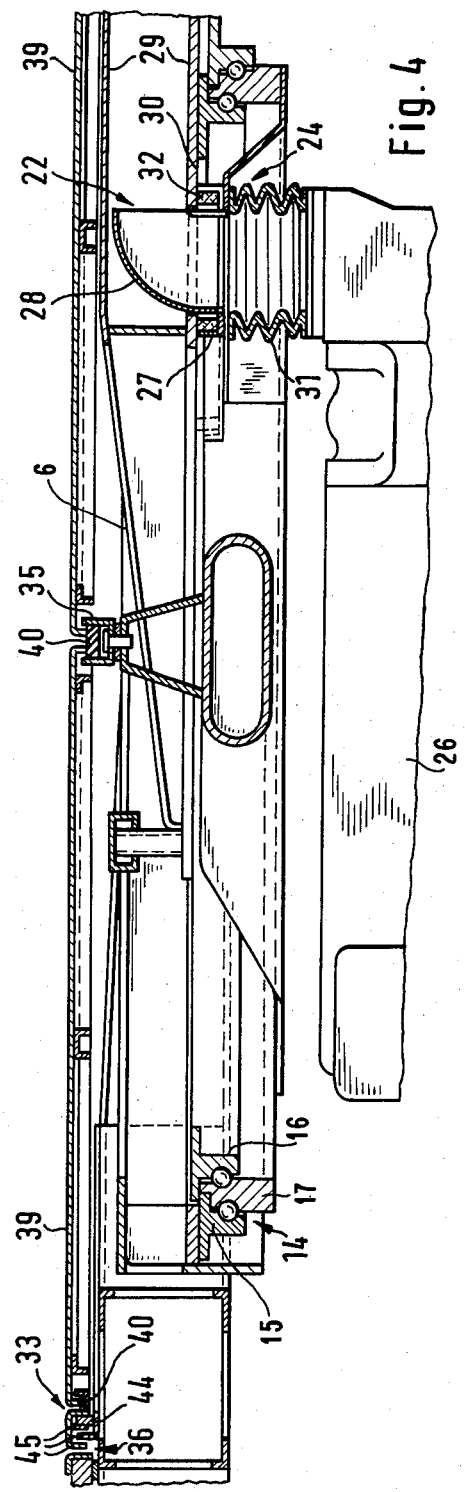

ARTICULATED RAILWAY CAR CONNECTING PASSAGE

This invention relates to a system for articulating bogie-type rail vehicles the adjacent ends of which are rested pivotably and rotatably by means of supporting arms projecting beyond their end trusses or headstocks on a single-part connecting portal joined by bellows to the car box ends and mounted on a bogie, said portal being tightly enclosed by sealing means on its full perimeter and having a spring-mounted platform supported with vertical freedom of movement but minimum play in all other directions on the bogie car, said platform being pivotably arranged by means of at least one centrally located large diameter ball race and by means of said supporting arms.

A system of this type was disclosed earlier by further development appears necessary towards ensuring that, in view of the installation of the longitudinally arranged motor of a driving bogie below the connecting portal, the space required, in particular for the sealing means, is substantially reduced.

A solution of this problem was also attempted and was intended to provide space to accommodate gas-spring bellows. Since, in this instance, above the gas-spring bellows accordion bellows are additionally required, this system is unable to meet the present-day requirements.

It is, therefore, an object of the present invention to further develop the known connection portals for bogie-type rail vehicles, especially urban rail vehicles, with a view to facilitate the placing therebelow of high-speed power bogies, especially with longitudinally arranged high output traction motors. This means that the loss of construction height to accommodate sealing means in the space below the floor should be minimized and provision must be made for a satisfactory admission of cooling air to the traction motors from higher levels in the superstructure.

This object and other objects and advantages of the invention will appear more clearly from the following specification in connection with the accompanying drawings, in which:

FIG. 1 diagrammatically illustrates a cross section through the center of the articulated connecting portal in the floor area with second spring system, rotation ball race, transverse frame or rocker arrangement between the portal proper and the longitudinally arranged traction motor.

FIG. 3 is a partially cross-sectioned plan view of the platform taken in the direction of arrows along the line III—III in FIGS. 1, 2 and 7.

FIG. 4 shows on a somewhat larger scale than FIG. 2 a section through the rotation ball race, turntable of the platform as well as the labyrinth seals of the turntable and in the air inlet duct, said section being taken along the line IV—IV in FIG. 3.

FIG. 5 illustrates a section along the line V—V of FIG. 3 showing details of the rotation ball race and its connection with the transverse support and the supporting space of the rear end car by means of a rubber-bonded metal compound bushing.

FIG. 6 is a section through the labyrinth seal between the lower end of the accordion bellows of the portal and the platform, said section being taken along the line VI—VI in FIG. 3.

Figure 1:
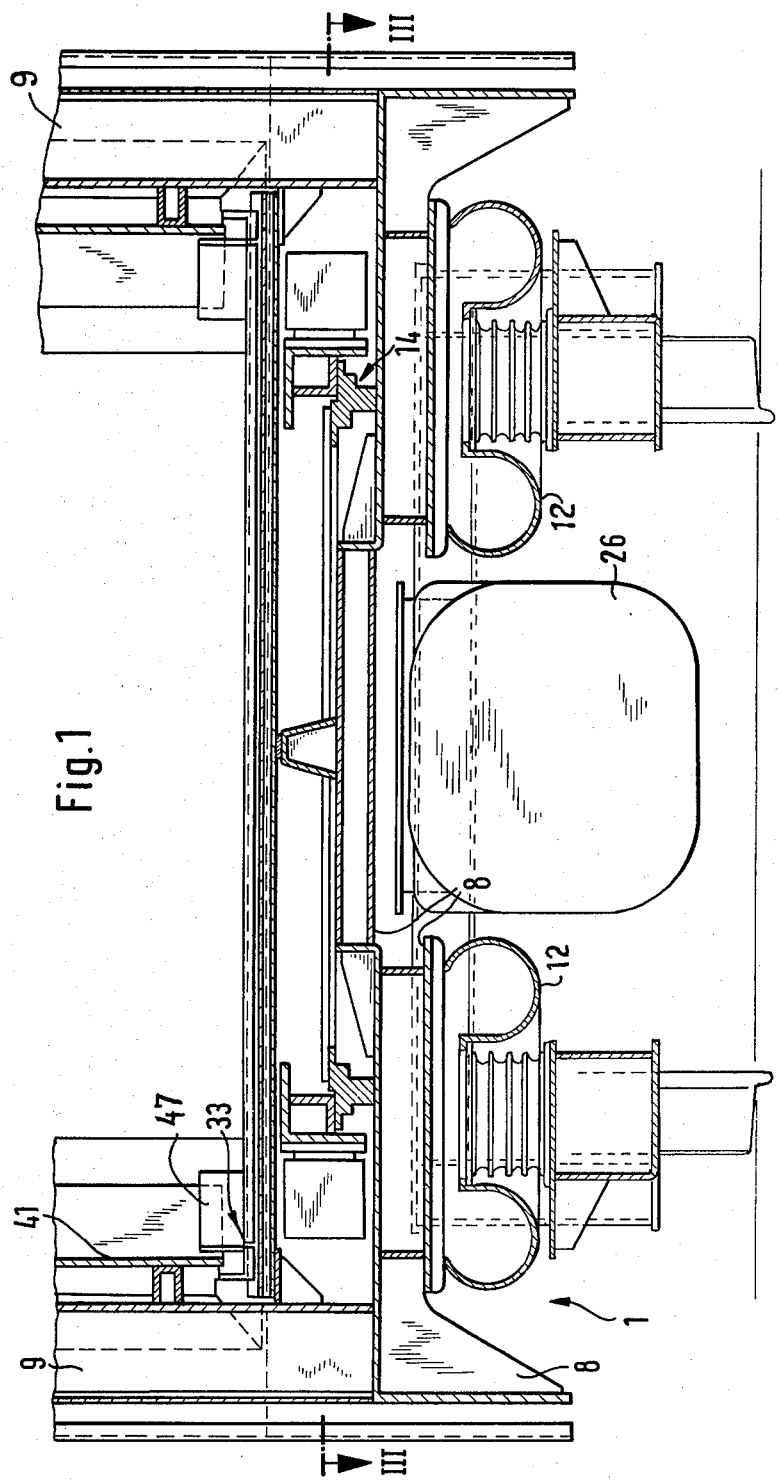

The system according to the invention for articulated bogie-type rail vehicles is characterized primarily in that a single two systems containing rotation ball race is provided which comprises three race rings and two ball systems, and that of said three race rings one race ring is kinematically associated with the front car body, another race ring is associated with the rear car body, and the third race ring is associated with the transverse support carrying the portal and said platform.

This system has the following advantages. No accordion joints or similar sealing means are required in the area below the floor level of the vehicle to seal it against the outside air in the area of the articulation portal.

Accordion bellows inherently form the most expensive and short-lived components of an articulated vehicle. Below the floor level, they are subjected to extra heavy stresses and, moreover, installation and removal is most complex and time-consuming. According to the invention, no accordion joints or similar components are required on the outer contour of the vehicle below the region of the floor. Likewise, the accordion bellows which is most adversely stressed has become superfluous in the air intake duct.

The construction height above the power bogie—preferably with a longitudinal electric motor—is dictated solely by the height required for the supporting structure and not by any additional requirement for the height of the sealing means.

In addition, the designer has gained space in the critical portal area by the use of a multi-system rotation ball race. This area may inter alia be used for an improved design of highly stressed components and the easier installation of the many lines extending through this area. The use of only one rotation ball race in place of two also amounts to a weight reduction.

The sealing means used in place of accordion bellows or similar arrangements are of a type which has been accepted for entirely different applications in the design and construction of railway rolling stock and with the use of which the shop personnel is therefore basically familiar. As a result, any technical risk is avoided.

The sealing means according to the invention provide sealing of the critical area underneath the floor in an ideal manner against draughts, the ingress of dirt as well as against noise. Referring now to the drawings in detail, the bolster, rocker, or transverse support 8 of the bogie 1, especially of a self-propelling bogie, which by means of bolster springs 12 (in this case shown in FIGS. 1 and 7 as air springs) is supported by the frame of the bogie 1, is firmly connected to the portal 9, which extends parallel to the vehicle contour. Firmly attached to this transverse support 8 is the center ball race ring 17 of the rotation ball race structure 14 FIG. 2 which in this case consists of three race rings 15, 16, 17 of FIG. 5. The front car body 20 of FIG. 3 is supported on an inner ball race 15 by a supporting arm 6 welded to the understructure and is also firmly attached to the race ring 15.

The outer race ring 16 is connected to a girder structure extending over an arc of about 210° and, thereby, is reinforced to such an extent that it is capable of supporting the rear car body 21 of FIG. 3 which is connected to it in a manner permitting vertical movement via rubber bonded metal bushings at a point outside the pivot connection. The rear car body is supported on inner ball race 15 by means of the supporting arm 7 in an analogous manner. The supporting arms 6 and 7 are firmly attached to the girders or end trusses of the underframes 4, 5, respectively, of car bodies 20 and 21.

Figure 7:
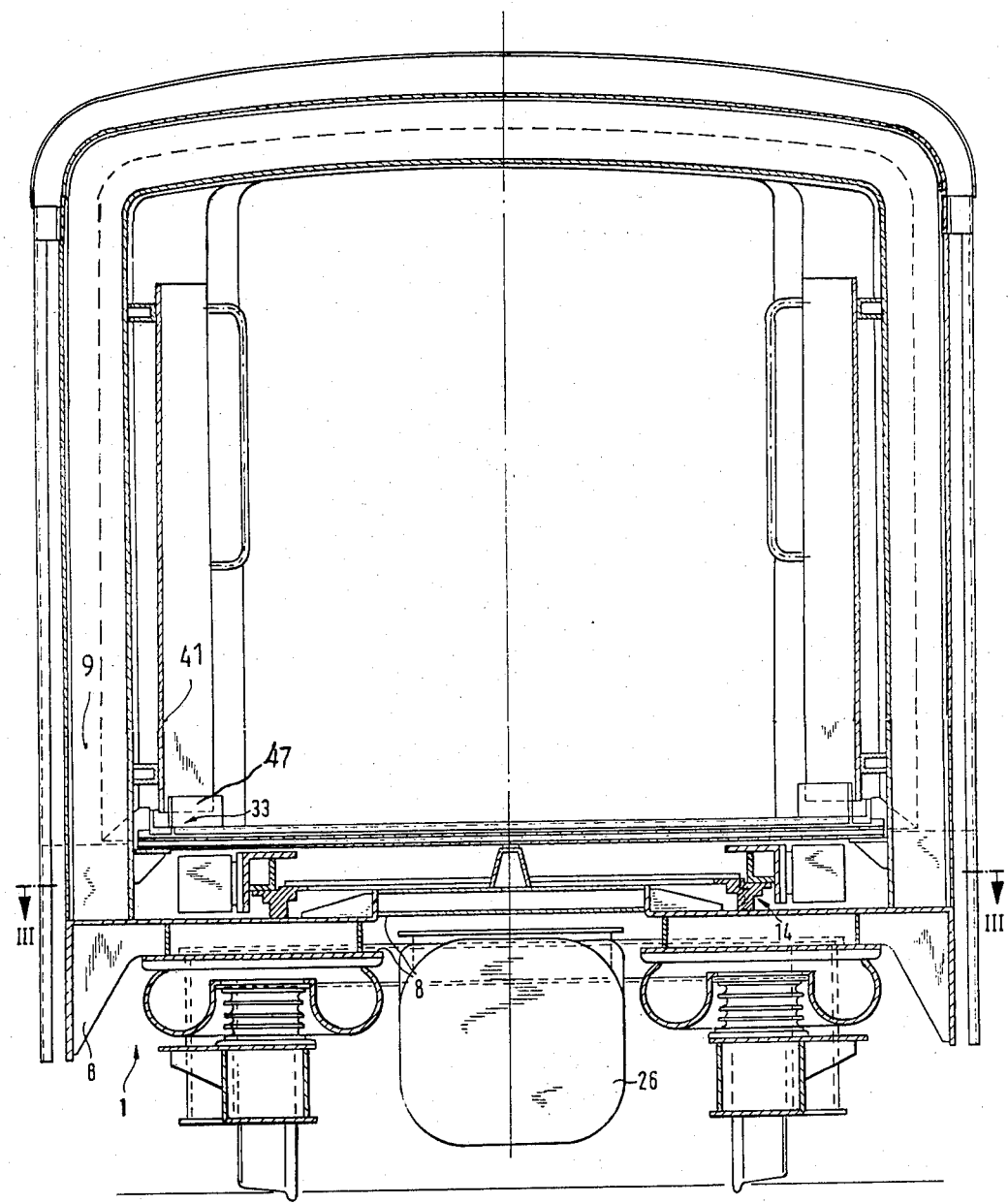
FIG. 7 is a section taken along a plane between the car bodies in a manner similar to FIG. 1 showing the entire portal.

This configuration takes care of all necessary movements of the car bodies relative to the bogie 1 up to, e.g., ±12° horizontal deflection on curves and, e.g., ±4° vertical deflection of the rear car body 21 relative to the bogie 1 or front car body 20 respectively. The filtered air required for cooling the motor 26 of FIGS. 1 and 7 is drawn in by the following construction through the underframe area of the front car body 20: A bellows 31 of FIG. 4 is interposed in the supply air duct 22 of the electric motor 26. The upper end of the bellows 31 is attached to a segment or an arcuately shaped pan 27 of FIGS. 3 and 4 screwed or bolted to the center race ring 17 of the rotation ball race structure 14. This bellows 31 compensates only the vertical displacements between the motor 26 supported in the bogie frame and the transverse support 8. Therefore, bellows 31 is only slightly subjected to stresses. The horizontal deflection on curves of, e.g. +12°, is taken care of by the pan 27 the cowling 28 of which projects through a suitably sized cutout into the support arm 6 of the front car body 20. This support arm 6 is designed as a hollow member having walls 29. Through this hollow member arm 6 and the adjoining parts of the supply duct 22, cooling air is drawn in. Sealing of the recess or cutout in the support arm 6 is effected by means of a sliding type seal which is firmly connected to the pan 27 and on which slides the sliding face 30 of the support arm 6 which sliding face 30 is accurately machined in this area and formed in the shape of an arcuate segment and hood.

The articulated portal 9 is lined in the direction toward the interior of a car body and sealed to prevent the ingress of air and dust as follows: A two-part bellows 10 is arranged between the end walls 2, 3, respectively, of the car bodies 20, 21 of FIG. 3 and the center part of the portal 9. This bellows 10 is of a type known per se and matched to the pertaining car body contour. This bellows 10 ends at the bottom roughly at the level of the floor 23 of FIG. 2 where it provides a seal relative to the turntable 33 of the platform 13 as shown in particular in FIGS. 4 and 6. This turntable 33 comprises two segment-shaped plate covers 39 which are pivotably supported on the connecting section 35 (of FIG. 4) which is arranged between the members of the portal 9 in order to be able to compensate the vertical deflection. The covers 39 are supported on the underframes at the car body ends by means of sliding contact bearers 44. In the area of the car bodies, this turntable 33 is sealed relative to the underframes by a sliding action or labyrinth type seal 36 which in this case has vertical strips 45 in addition to a rubber covering 40 and the sliding member 44.

In the area of the transition of the car body ends into the platform 13, the bellows 10 by means of a labyrinth and/or sliding contact seal 11 slidably follow a vertical plate 37 of the turntable 33 with sealing action being provided by a resilient bar 38 (such as a velour or brush strip). The vertical plate 37 is engaged by guide members 46.

The surface inside the turntable 33 is covered by the two semicircular or segment-shaped plate covers 39 which are supported on the connecting section 35 and on the segment-shaped turntable 33 in rubber mountings 40.

A guard 41 protects the bellows 10 up to a height of about 1.5-2 m from contact by the passengers. This guard 41 is secured on each side to the portal 9. Above this guard 41, the bellows 10 is visible from the inside. From the outside, the bellows is protected and made largely invisible by the metal panels 42 of the portal 9. In the interior of the car body, the vertical plate 47 is raised to a level above the portal floor.

The upper pivotal connection of the portal 9 is effected in the conventional manner by means of linkages.

Figure 2:
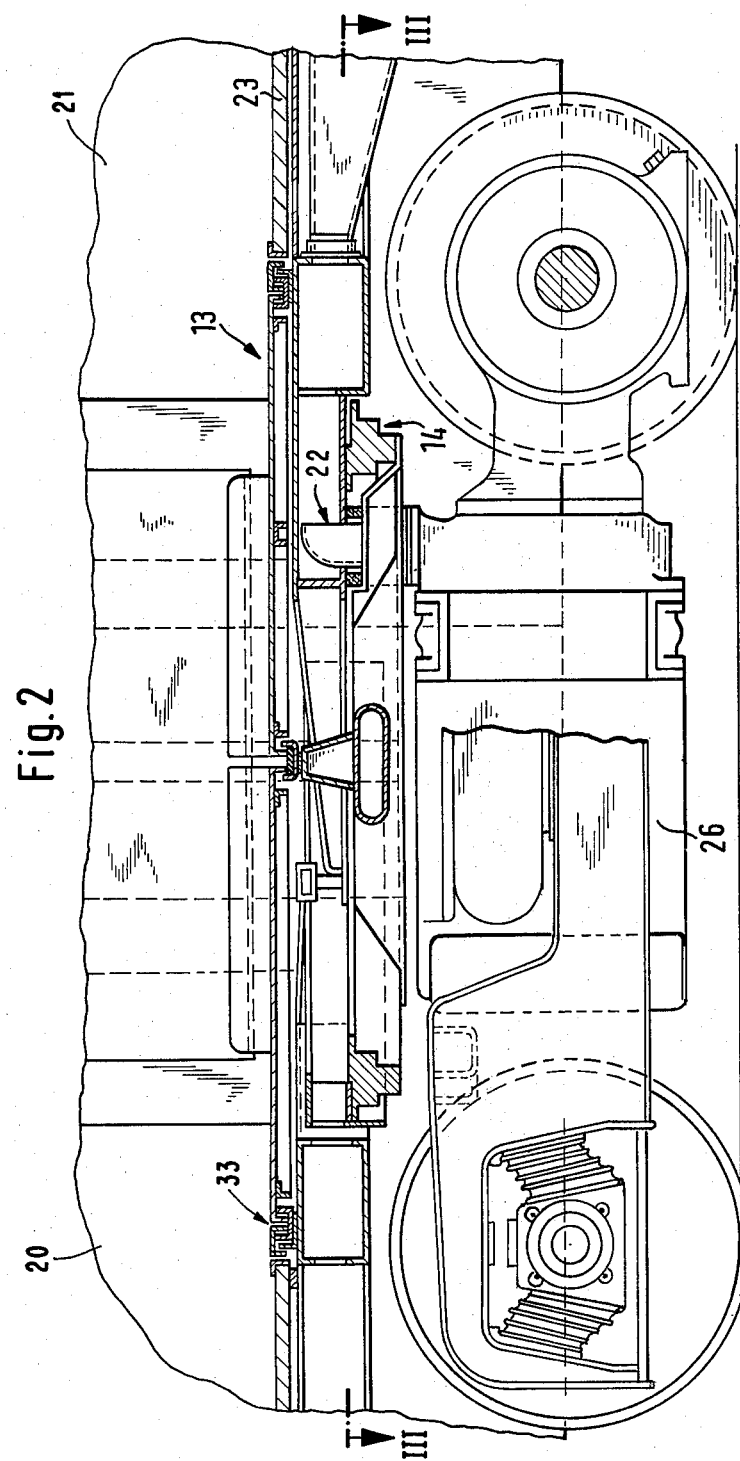
FIG. 2 is a central longitudinal section through the portal according to FIG. 1 with the air inlet duct for the traction motor.

FIG. 7 is a cross section taken through the separation planes of both car boxes or bodies. The section line is identical with that of FIG. 1 even though the entire revolving or swinging portal 9 is shown. The entire portal 9 is supported by way of a transverse support or carrier 8 and lateral air-spring bellows 12 against bogie 1 (FIGS. 1, 2). Both of the non-illustrated car boxes or bodies in any event are journalled upon the air-spring bellows 12 by way of the two-part ball structure 14 and transverse carrier or support 8. A middle motor 26 has space by way of the low construction height of the inner connected ball race structure 14 and the motor 26 is shown in FIG. 2 driving the wheel set by way of the gear or drive means therewith. The platform 13 which likewise is supported upon a ring of the ball race structure 14 if closed or sealed along its periphery by a turntable 33. For the protection of guest occupants there is additionally provided a cover 41 which precludes that the guest occupants are pinched or squeezed in the folding bellows 10 during diverting or movement of the car box or body during travel in a curve or bend. The cover 41 is rigidly connected with the portal 9.

It is, of course, to be understood that the present invention is, by no means, limited to the specific showing in the drawings but also comprises any modifications within the scope of the appended claims.

What I claim is:

1. A linking system for articulated vehicles which includes two car bodies having adjoining ends supported on bogie means, said bodies having end trusses and supporting arms extending beyond said end trusses, bogie means having a frame supporting said bodies thereon, a transverse support resiliently supported on said frame, the supporting arms of the adjoining ends of said bodies being pivotally supported on said transverse support, a one-piece connecting portal interposed between and interconnecting said first and second bodies and carried on said transverse support, bellows connecting said portal to adjacent car bodies of said vehicles, said connecting portal comprising a platform resiliently movable in a universal direction, said platform being arranged on said transverse support, and a dual-row ball race structure including a rotation ball race coaxial with said platform and together with said supporting arms pivotally supporting said platform, said rotation ball race having three race rings effecting relative motion independently of each other and two rows of balls, and the supporting arms of one body being supported on one of said race rings and the supporting arms of the other body being supported on another one of said race rings, and the third race ring of said race rings being supported on said transverse support supporting said portal and said platform, and being concentric with and positioned between said other two race rings and supporting said other two race rings on bearings therebetween.

2. A linking system in combination according to claim 1, which includes a portal, and accordion bellows arranged above the flooring of said car bodies and also includes a covering connected to said portal and an additional upright plate arranged within the region of said portal and guided substantially parallel to said covering.

3. A linking system in combination according to claim 1, which includes motor means for propelling said bogie means, and an air duct for supplying cooling air to said motor means, said air duct having a vertical branch, and a labyrinth seal sealing said vertical branch in the area between said body and the pertaining bogie means.

4. A linking system in combination according to claim 1, in which each of said vehicles comprises flooring, bellows means arranged somewhat above said flooring and also additional sealing means for sealing the interior of said vehicles against the outer air.

5. A linking system in combination according to claim 4, in which said additional sealing means comprises at least one upright plate arranged on said rotation ball race and a resilient bar slidable on said upright plate.

6. A linking system in combination according to claim 5, which includes guiding elements guiding said upright plate.

7. A linking system in combination according to claim 1, which includes motor means for propelling said bogie means, an air duct for supplying cooling air to said motor means, said air duct having a vertical branch, and sliding sealing means sealing said vertical branch in the area between said body and the pertaining bogie means.

8. A linking system in combination according to claim 7, in which said sliding sealing means has a lower part forming a segment-shaped pan and an upper part forming in plan view a similarly segment-shaped pan, said sliding seal means also being provided with a hood shaped cowling and having a sliding face with a yieldable sealing substance thereon.

9. A linking system in combination according to claim 8, in which said rotation ball race pertains to a platform and comprises two segment-shaped covers, and in which said sealing means of said rotation ball race supporting said segment-shaped covers of said platform has a rubber cover.

10. A linking system in combination according to claim 8, in which said rotation ball race pertains to a platform and comprises two segment-shaped covers, and in which said sealing means of said rotation ball race supporting said segment-shaped covers of said platform has a sliding element and webs.

11. A linking system in combination according to claim 10, which includes a connecting section supporting said covers and being supported on said transverse support, said transverse support being firmly connected to said rotation ball race.

12. In an articulated rail vehicle having two car bodies with their adjoining ends pivotally supported about a vertical pivotal axis on bogie means, a bearing structure for supporting said ends comprising: three concentric bearing races coaxial with the pivotal axis for said adjoining ends, including an intermediate race supported on said bogie means, and inner and outer races supported on said intermediate race by bearings therebetween, the adjoining end of each car body extending over one of said inner and outer races, respectively, and supported thereon, so that each end is supported on one of said races for pivotal movement relative to said intermediate race and said bogie means independently of the other adjoining end.

* * * * *